United States Patent [19]

Bienert et al.

[11] 4,060,274
[45] Nov. 29, 1977

[54] MOTOR VEHICLE ROOF

[75] Inventors: Horst Bienert, Gauting; Hans Jardin, Inning; Walter Schätzler, Aufhausen, all of Germany

[73] Assignee: Webasto-Werk W. Baier GmbH & Co., Germany

[21] Appl. No.: 743,987

[22] Filed: Nov. 22, 1976

[30] Foreign Application Priority Data

Nov. 25, 1975 Germany .................. 2552773

[51] Int. Cl.² ........................... B60J 7/02
[52] U.S. Cl. ............................. 296/137 G
[58] Field of Search .............. 296/137 G, 137 E

[56] References Cited

U.S. PATENT DOCUMENTS 3,976,325  8/1976  Schätzler .............. 296/137 G

FOREIGN PATENT DOCUMENTS 865,506  12/1958  United Kingdom ........... 296/137 G

Primary Examiner—Robert R. Song
Attorney, Agent, or Firm—Craig & Antonelli

[57] ABSTRACT

A ratchet wheel and abutment pin arrangement is provided for limiting movement of a movable roof panel member as it travels between a closed position and respective raised tilted and lowered slidably retracted positions. The ratchet wheel is provided with a guide slot at one axial end face for receiving the abutment pin during sliding movement of the roof panel member and with a further guide slot for the pin member at the opposite axial end face of the ratchet wheel for guiding the abutment pin member during tilting movement of the roof member. These guide slots are interconnected with one another at an overlapping passage to accommodate axial displacement of the pin member from one slot section to the other slot section, said overlapping passage also exhibiting abutment end surfaces corresponding to the closed position of the roof member.

20 Claims, 10 Drawing Figures

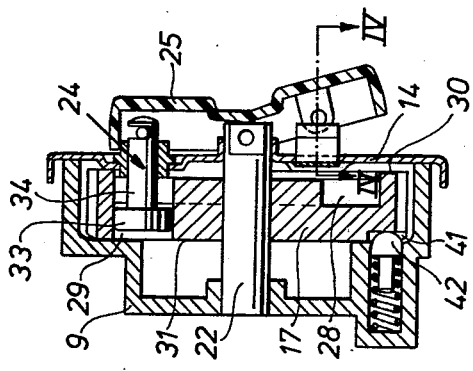
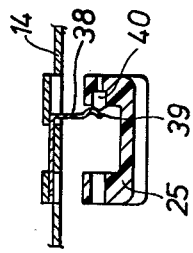
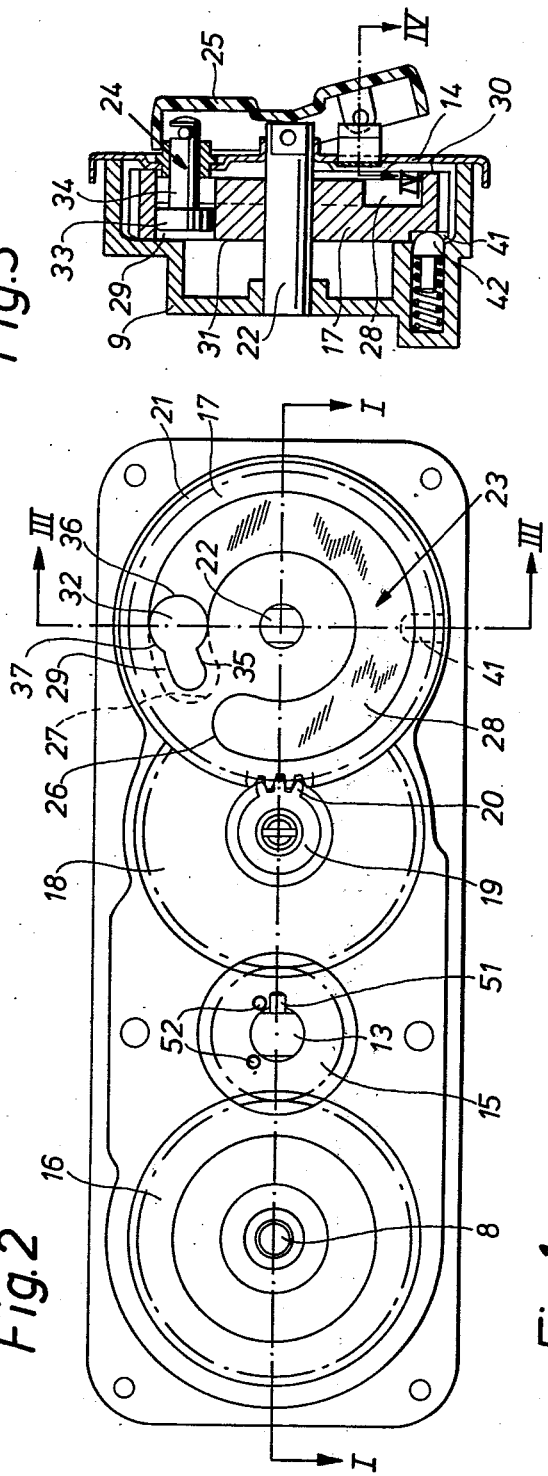
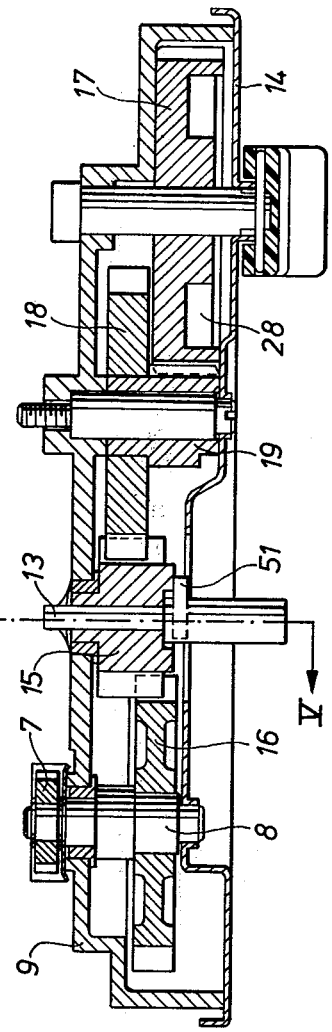

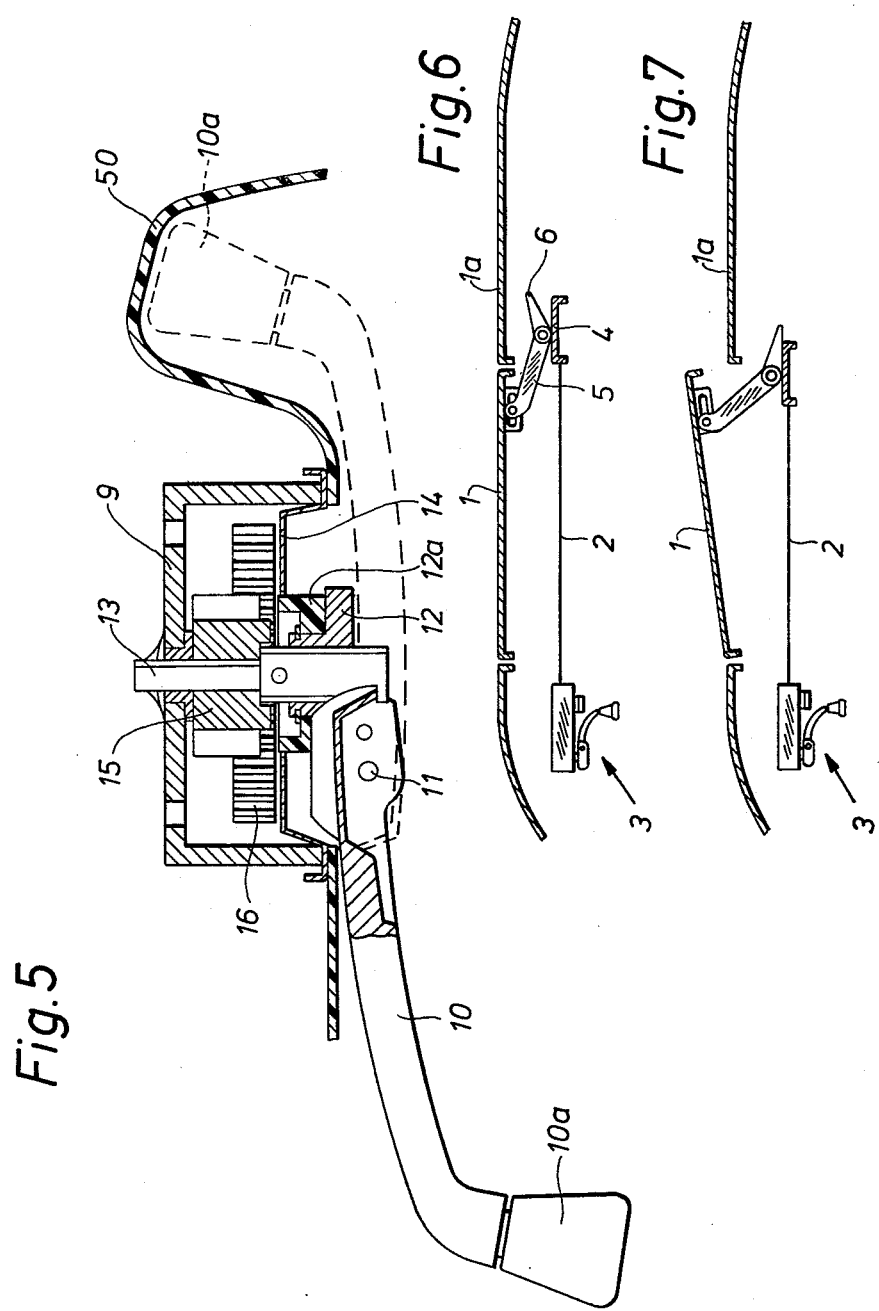

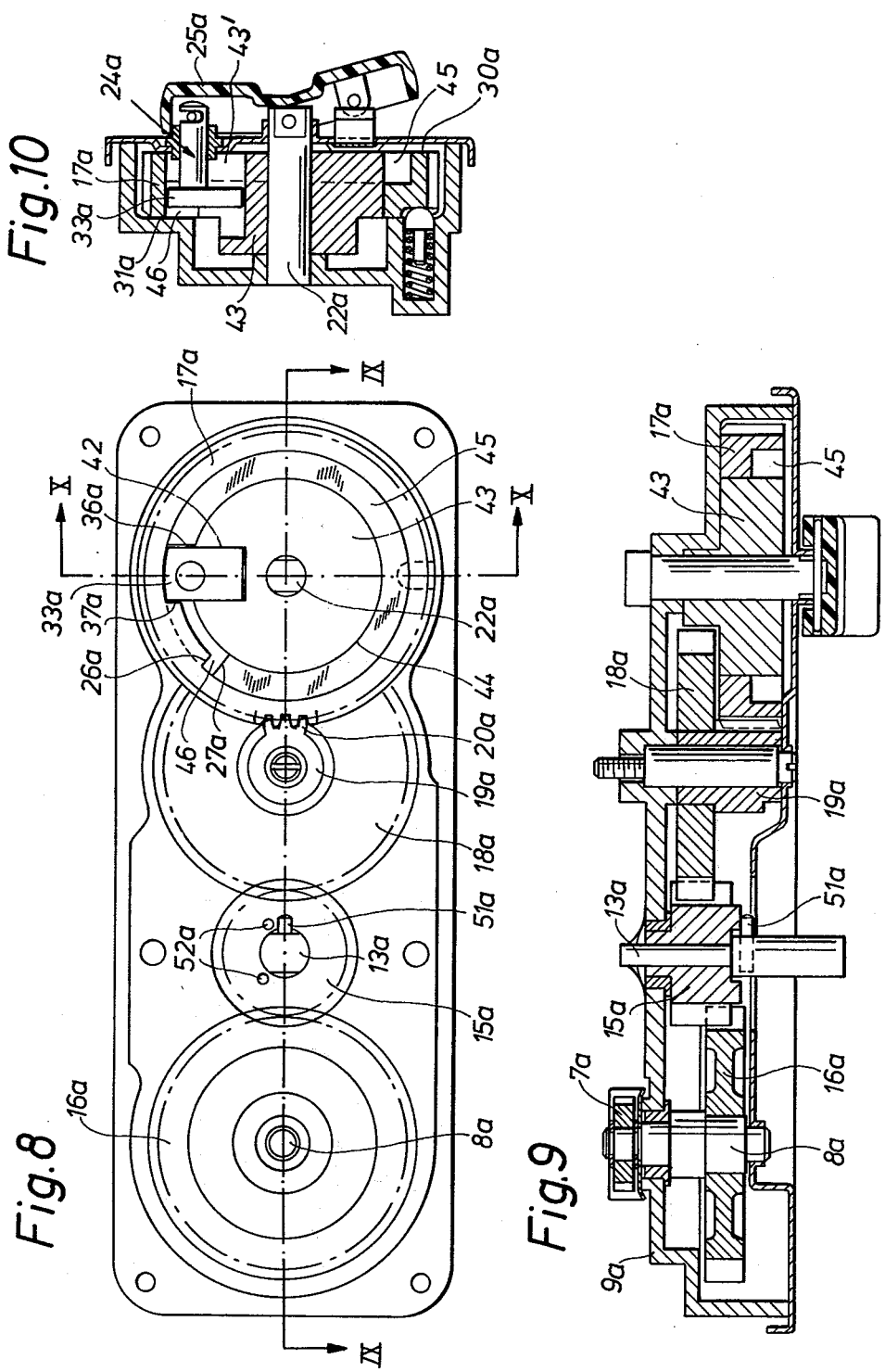

MOTOR VEHICLE ROOF

BACKGROUND AND SUMMARY OF THE INVENTION

The invention relates to tiltable sliding vehicle panel members. Preferred embodiments of the invention relate to tiltable, slidable vehicle roof panel members (i.e., vehicle roofs having an aperture closable by a sliding panel pivotable upwardly to extend from the fixed part of the roof in an "inclined" position and alternatively slidable below a fixed part of the roof to a "withdrawn" position) of the kind having a crank drive mechanism comprising a rotatable crank drivingly connected with said panel and being connected via a gear with a ratchet wheel having a concentric guide slot wherein engages a displaceably mounted pin to restrain rotation of the crank when the panel is in its closed position. Said roofs are referred to hereinafter as "tiltable sliding roofs of the kind referred to."

In a known tiltable sliding roof of the kind referred to (see German Offenlegeschrift No. 2,231,383) the ends of the guide slot form terminal abutments for the crank mechanism in the withdrawn and closed positions of the roof panel. In order to be able to tilt the roof panel the pin can be removed from the guide slot with the roof panel closed, so that the crank arm can be further rotated and the roof can be tilted open. In order to obtain an abutment for the crank mechanism with the roof panel in its inclined position, a second pin is coupled with the operating mechanism for the first pin. This second pin can engage in a second guide slot provided on the ratchet wheel, when the latter is in a corresponding position in the closed position of the roof panel. The end of the second guide slot forms an abutment for the second pin and determines the end of the tilting movement of the roof. This arrangement of two guide slots and two pins is costly.

An object of the invention is to provide a crank drive mechanism for a tiltable sliding roof of the kind referred to which provides the abutments necessary for the reliable operation of the roof panel in a more simple manner.

According to the invention, there is provided a tiltable sliding roof of the kind referred to wherein the guide slot has a first section which receives the pin during sliding movement of the roof panel and a second section which receives the pin during tilting movement of the roof panel, said sections overlapping in an interconnecting passage permitting displacement of the pin from one section to the other when the roof panel is in the closed position and the overlapped ends of the sections constituting respective abutments for the pin in the closed position of the roof panel.

In the preferred embodiments shown in the drawings, the other ends of the guide slot sections form abutments for the pin in the withdrawn position and in the inclined position of the roof panel respectively. However, other embodiments are contemplated where the tilting movement and the sliding movement are limited by other means.

By subdividing the guide slot into two sections, with one section associated with the sliding movement of the roof panel and the other with tilting movement of the roof panel, all the roof movements can be controlled by a single guide slot. Thus, both the movement of the roof from the inclined position into the closed position and for the movement of the roof from the withdrawn position into the closed position is limited by the same pin and the closed position can only be passed after moving the pin from one section into the other section.

Preferably, one section of the guide slot is arranged in one lateral surface of a ratchet wheel and the other section of the guide slot is arranged in the other lateral surface of the ratchet wheel, whereby the sections are interconnected at the point where the pin is located with the roof panel closed by means of an opening permitting the passing of the pin from one into the other section. The pin can thereby have a mushroom-shaped configuration, with a head diameter corresponding to the width of the first and second sections of the guide slot and with the first section of the guide slot extending into the area of the second section with a width corresponding to the diameter of the pin shank. The transition from the one to the other section of the guide slot then forms the above-mentioned abutment for the closed position of the roof.

The pin is preferably fixed at one end of a rocker pivoted to a spindle on which the ratchet wheel is rotatably mounted. The other end of the rocker carries a cam which cooperates with a control spring to secure the rocker in one or other positions of the pin.

In order to be able to fix the precise closed position of the roof despite manufacturing tolerances, it is preferable to provide a recess on the ratchet wheel in which a resiliently mounted arresting member engages when the ratchet wheel position corresponds to the closed position of the roof panel.

In order to be able to better absorb the forces which occur when the pin strikes on the ends of the guide slot or on the abutments determining the closed position of the roof, according to another preferred embodiment the pin is arranged so as to move axially in a fixed disk arranged concentrically relative to the ratchet wheel. This disk can with its outer surface simultaneously form the mounting for the ratchet wheel and also by means of a groove on one side and a recess on the other side of the ratchet wheel, form the guide slot for the pin.

In the case of such sliding roof drives, it is necessary for safety reasons to ensure that when not needed, the crank arm can be removed from the area of impact of the head. This can be achieved in simple manner according to the invention by providing a recess in the inner lining of the roof into which, in a particular circumferential position, the crank arm can be retracted. In the case of simple sliding roofs which are not tiltable there is no difficulty in bringing the crank into a position where it can be retracted into said recess because the sliding path of the sliding roof is sufficiently large that no significant sliding of the roof results from a forward or backward rotation of the crank arm which is necessary for bringing it into this position. However the short tilting path in the roof of the invention means that the rotation of the crank arm has a considerable effect on the roof panel position. To obviate this problem, the crank shaft is preferably connected with a toothed driven wheel located thereon via at least one stop member which permits a free rotation of the crank relative to the toothed wheel by an angular range of less than 360°. As a result of this idle motion, the crank arm can be brought in any position of the sliding roof panel and without any movement of the roof panel into a position in which it can be retracted into the recess. In the vicinity of a lateral surface of the toothed wheel, the shaft preferably has a radially projecting pin which cooperates with at least one pin projecting from said lateral surface. In order to keep the idle motion of the crank as small as possible, two pins are preferably provided on the shaft or on the lateral surface of the toothed wheel which cooperate with a pin on the opposite member and permit an idle motion of for example 240°. This idle motion arrangement of the crank according to the invention is not restricted to a crank drive mechanism according to the invention.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a sectional view along the line I—I of FIG. 2, through a crank drive mechanism of a first embodiment of the invention, showing a lower cover plate in position but with crank arm and boss omitted;

FIG. 2 is a view of the drive mechanism of FIG. 1 from below with the lower cover plate omitted;

FIG. 3 is a sectional view along the line III—III of FIG. 2;

FIG. 4 is a sectional view along the line IV—IV of FIG. 3;

FIG. 5 is a sectional view along the line V—V of FIG. 1, with the crank arm and boss and connecting roof portions shown;

FIG. 6 is a schematic view of a vehicle roof with a tiltable sliding roof panel in its closed position;

FIG. 7 is a view corresponding to FIG. 6 showing the sliding roof panel in its fully inclined position, and FIGS. 8, 9 and 10 are respective sectional views corresponding to FIGS. 1, 2 and 3, but showing a crank drive mechanism of a second embodiment of the invention.

DETAILED DESCRIPTION OF THE DRAWINGS

Referring to FIGS. 6 and 7, a roof panel 1 is shown which is movable from its closed position shown in FIG. 6, rearwards under the fixed roof portion 1a into a withdrawn position or tilted into an inclined position (shown in FIG. 7) by means of a cable 2 operated by a crank drive mechanism 3. In the represented embodiment, cable 2 is fixed to a transport bridge 4 carrying a lever mechanism 5, which is connected to the roof panel and also is guided at 6 in a link guide (not shown). Tiltable sliding roofs of this type are known and are described, for example, in German Offenlegeschrift No. 1,933,991.

The crank drive mechanism of the present invention is shown in detail in FIGS. 1 to 5. It has a driving pinion 7, whose external teeth engage with cable 2, which pinion 7 is rigid and fixed on a shaft 8 mounted in rotary manner in gear-box 9. Gear-box 9 is fixed to the fixed parts of the vehicle roof using conventional means. The pinion 7 is driven by a manually operable crank arm 10 which is pivoted at 11 to a rotary boss 12 which is in turn fixed on a shaft 13. Shaft 13 is mounted for rotation in gear-box 9. Boss 12 is mounted for rotation in a bearing 12a, which is in turn fixed to gear-box 9. A toothed wheel 15 which is in engagement with a toothed wheel 16 fixed to pinion shaft 8, is mounted for rotation on shaft 13.

In order to provide restraints for crank arm 10 in the withdrawn position, closed position and inclined position of roof panel 1, a ratchet wheel 17 is arranged in gear-box 9 and is driven by toothed wheel 15 on shaft 13 via an intermediate wheel 18 and a pinion 19 rotatable therewith. As can be seen in FIG. 2, pinion 19 has only three teeth 20 which come in mesh with the external teeth 21 of ratchet wheel 17. As a result, in conjunction with the ratios of teeth on toothed wheels 15 and 18, a large gear ratio is obtained which is necessary for obtaining the crank arm rotations required for bringing roof 1 from its inclined position of FIG. 7 via the closed position into its withdrawn position, whereby this movement corresponds to almost one rotation of ratchet wheel 17.

Ratchet wheel 17 is mounted for rotation on a spindle 22 secured in gear-box 9 and has a concetric guide slot 23 in which engages a pin 24, fixed to an end of a rocker 25 rotatably mounted on the spindle 22. The length of guide slot 23 is such that pin 24 abuts one end 26 when roof panel 1 is in the withdrawn position and the other end 27 when the roof panel 1 is in the inclined position. So that the user recognizes when the roof panel 1 is in its closed position, guide slot 23 is subdivided into two sections 28 and 29, whereof section 28 is provided in the bottom 30 and section 29 in the top 31 of the ratchet wheel. One pair of ends of the two sections 28 and 29 overlap to form an opening 32 for a head 33 of pin 24 in the closed position of roof panel 1. The diameter of head 33 corresponds to the width of the guide slot sections 28 and 29. To permit the guidance of pin 24 in section 29, section 28 is continued at 35 into section 29, but with a reduced width corresponding to the diameter of shank 34 of pin 24.

In the position of pin 24 shown in FIG. 3, its head 33 is located in guide slot section 29 and specifically at the right-hand end 36 thereof in FIG. 2, which means that roof panel 1 is in its closed position. Thus, a rotation of crank arm 10 can only take place in the direction of tilting the roof, until head 33 of pin 21 abuts end 27 of the guide slot 29. If the sliding roof panel is to be moved rearwards from the closed position, pin 24 with its head 33 must be removed from guide slot section 29, until it is located in guide slot section 28. This is brought about by movement of rocker 25. On rotating crank arm 10 to move back roof panel 1, ratchet wheel 17 also rotates until the head 33 of pin 24 abuts the other end 26 of guide slot 23. When, after advancing, it has again reached its closed position, the head 33 of pin 24 abuts shoulder 37 of guide slot section 28. Only in this position of ratchet wheel 17 is it possible for head 33 of pin 24 to pass from one into the other guide slot section. In order to arrest pin 24 in one or other positions, a spring 38 with a nose 39 is arranged in the cover plate 14 of gear-box 9 to cooperate with a cam 40 on the end of rocker 25 remote from pin 24.

To ensure that the precise closed position of the roof panel is found despite manufacturing tolerances, ratchet wheel 17 is provided with a recess 41 in which a resilient arresting member 42 is engaged in the position of ratchet wheel 17 corresponding to the closed position of roof panel 1.

The embodiment of FIGS. 8 to 10, in which the same components as occur in the first embodiment are given the same reference numerals but with the suffix "a," in principle differs from that of FIGS. 1 to 4 only in that the head 33a of pin 24a is guided in rectangular and axially displaceable manner in a correspondingly shaped radial slot 43' provided in a disk 43 rigidly connected with spindle 22a. In this embodiment, ratchet wheel 17a is mounted for rotation on the outer periphery 44 of disk 43. On the bottom 30a of ratchet wheel 17a is provided a groove 45, which forms a radial clearance with the outer periphery 44 of disk 43 and corresponds to section 28 of guide slot 23 in FIGS. 1 to 3. On the top 31a of ratchet wheel 17a is provided a recess 46 in the form of a circular segment which forms a guide slot section with the peripheral surface 44 of disk 43 and which corresponds to section 29 in FIGS. 1 to 3. In groove 45 are provided two abutments 26a and 37a which abut on the lateral surfaces of head 33a of pin 24a when the roof panel 1 is in its withdrawn position or in its closed position. Recess 46 on the top 31a of pin 17a has an end 27a against which abuts the head 33a of pin 24a when roof panel 1 is in its inclined position and an end 36a against which abuts head 33a with roof panel 1 closed. As can be seen, recess 46 and groove 45 overlap in the area between ends 36a and 37a, so that in this area head 33a can slide from groove 45 into recess 46 and vice versa.

The function of the embodiment of FIGS. 8 to 10 is precisely the same as that of the first embodiment. The advantage of this second embodiment is that the pin 24 is secured better by the arrangement in the recess 42 of disk 43 than in the case of the first embodiment in which the pin 24 is only fixed to cover plate 14, whereby the latter could be deformed up to abutment of pin head 33 with abutment 37 or 36 through forcible operation of the crank handle.

As can be seen in FIG. 5, crank arm 10 is pivoted at 11 on boss 12 so as to be able to swivel in such a way that crank knob 10a is accommodated into recess 50 of the inner lining of the roof or into a cover flange. For space reasons, this recess 50 is only provided in a radial direction. If shaft 13 was rigidly coupled with toothed wheel 15, crank arm 10 could only be retracted into recess 50 in one position during each rotation. To permit the retraction after only partial rotation of crank 10, an idle motion is provided between toothed wheel 15 and shaft 13 in the embodiment according to FIGS. 1 and 5. This shaft 13 has a radially projecting pin 51, cooperating with a pin 52 projecting axially from the bottom of wheel 15. In FIG. 2, two such projecting pins are provided in order to keep the idle motion of crank arm 10 as small as necessary. It is clear that when there are two pins 52 crank arm 10 can be rotated by more than 180° without rotation of toothed wheel 15 so that crank arm 10 can be retracted into recess 50 in any position of roof panel 1.

While we have shown and described several embodiments in accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

We claim:

1. Movable vehicle panel member apparatus comprising:
 a vehicle panel member,
 driving means for tiltingly and slidingly moving said panel member with respect to adjacent vehicle structure,
 a movement control member engageable and movable with said driving means for limiting movement of said panel member as a function of the position of said movement control member,
 and an abutment member engageable with said movement control member for limiting movement of said movement control member,
 wherein said movement control member includes a first guide section which receives the abutment member during sliding movement of the panel member and a second guide section which receives the abutment member during tilting movement of the roof panel,
 wherein said first and second guide sections overlap at an interconnecting passage permitting displacement of said abutment member between said guide sections when said panel member is in a predetermined intermediate position.

2. Apparatus according to claim 1, wherein said vehicle panel member is a roof panel member, and wherein said predetermined intermediate position corresponds to the closed position of said roof panel member.

3. Apparatus according to claim 1, wherein said movement control member is a rotatably mounted ratchet wheel having gear teeth engageable with a gear member which is rotated during movement of said panel member by said driving means, and wherein said first and second guide sections include respective first and second guide slot sections in said ratchet wheel.

4. Apparatus according to claim 3, wherein the overlapped ends of said guide slot sections at said interconnecting passage constitute respective abutment for the abutment member in the closed position of the panel member.

5. Apparatus according to claim 4, wherein said vehicle panel member is a roof panel member, and wherein said predetermined intermediate position corresponds to the closed position of said roof panel member.

6. Apparatus according to claim 3, wherein said first and second guide slot sections are disposed at respective opposite axial end faces of the ratchet wheel.

7. Apparatus according to claim 6, wherein said abutment member is a pin, and wherein the pin has a head carried on a shank, the head diameter corresponding to the width of the guide slot sections and the first guide slot section extending into the area of the second guide slot section with a width corresponding to the diameter of the shank.

8. Apparatus according to claim 7, wherein the pin has a head which is arranged in axially movable manner in a radial recess of a fixed disk concentric to ratchet wheel.

9. Apparatus according to claim 8, wherein the outer periphery of said disk forms the bearing surface for the ratchet wheel, and wherein a groove on one side and a recess on the other side of the ratchet wheel forms the guide slot sections.

10. Apparatus according to claim 6, wherein said abutment member is a pin, and wherein the ratchet wheel is mounted for rotation on a spindle and the pin is fixed to one end of a rocker pivoted to said spindle.

11. Apparatus according to claim 10, wherein the other end of the rocker carries a cam which cooperates with a control spring to secure the rocker in one or the other position of the pin.

12. Apparatus according to claim 3, wherein the ratchet wheel has a recess in which a resiliently mounted arresting member engages when the ratchet wheel position corresponds to the closed position of the panel member.

13. Apparatus according to claim 12, wherein said vehicle panel member is a roof panel member, and wherein said predetermined intermediate position corresponds to the closed position of said roof panel member.

14. Apparatus acording to claim 1, wherein said driving means includes a crank arm rotatable with a shaft on which a driven toothed wheel is rotatably mounted, said crank arm being pivoted to the shaft for retraction into a recess in the vehicle body parts inner lining and wherein said shaft is connected with the toothed wheel located thereon via at least one stop member permitting a free rotation of said crank relative to said toothed wheel by an angular range of less than 360°.

15. Apparatus according to claim 5, wherein said driving means includes a crank arm rotatable with a shaft on which a driven toothed wheel is rotatably mounted, said crank arm being pivoted to the shaft for retraction into a recess in the vehicle body parts inner lining and wherein said shaft is connected with the toothed wheel located thereon via at least one stop member permitting a free rotation of said crank relative to said toothed wheel by an angular range of less than 360°.

16. Apparatus according to claim 14, wherein said shaft has a radially projecting pin in the vicinity of one lateral surface of the toothed wheel and which cooperates with at least one pin projecting from said lateral surface.

17. Apparatus according to claim 3, wherein the non-overlapping ends of the guide slot sections form stop members for the abutment member in the withdrawn and inclined position of the roof panel respectively.

18. Apparatus according to claim 5, wherein said driving means includes a manually rotatable crank arm connected to a driven toothed wheel, and wherein an intermediate toothed wheel drivingly connects said driven toothed wheel and said ratchet wheel.

19. Apparatus acording to claim 18, wherein said abutment member is a pin, and wherein the ratchet wheel is mounted for rotation on a spindle and the pin is fixed to one end of a rocker pivoted to said spindle.

20. Apparatus according to claim 19, wherein the other end of the rocker carries a cam which cooperates with a control spring to secure the rocker in one or the other position of the pin.

* * * * *